(12) United States Patent
Kurachi et al.

(10) Patent No.: US 7,852,008 B2
(45) Date of Patent: Dec. 14, 2010

(54) DIELECTRIC BARRIER DISCHARGE LAMP LIGHTING DEVICE

(75) Inventors: Toshiaki Kurachi, Kyoto (JP); Satoshi Kominami, Osaka (JP)

(73) Assignee: Panasonic Corporation, Osaka (JP)

( * ) Notice: Subject to any disclaimer, the term of this patent is extended or adjusted under 35 U.S.C. 154(b) by 680 days.

(21) Appl. No.: 10/588,544

(22) PCT Filed: Mar. 27, 2006

(86) PCT No.: PCT/JP2006/306133
§ 371 (c)(1),
(2), (4) Date: Aug. 7, 2006

(87) PCT Pub. No.: WO2006/120809
PCT Pub. Date: Nov. 16, 2006

(65) Prior Publication Data
US 2008/0252225 A1    Oct. 16, 2008

(30) Foreign Application Priority Data
May 13, 2005    (JP) ............... 2005-140881

(51) Int. Cl.
*H05B 39/00*    (2006.01)
(52) U.S. Cl. .............. 315/177; 315/209 R; 315/219
(58) Field of Classification Search .......... 315/177, 315/209 R, 219, 221, 209 PZ, 291, 326, 349, 315/354, 356
See application file for complete search history.

(56) References Cited
U.S. PATENT DOCUMENTS
5,495,405 A    2/1996    Fujimura et al.

2003/0210562 A1    11/2003    Takehara et al.
2003/0222593 A1    12/2003    Yamamoto
2005/0093478 A1*   5/2005    Shiba ................... 315/246
2007/0007899 A1*   1/2007    Zhang et al. ........... 315/169.3

FOREIGN PATENT DOCUMENTS

| EP | 0 647 086 | 4/1995 |
| EP | 1 361 653 | 11/2003 |
| EP | 1 370 122 | 12/2003 |
| EP | 1 427 264 | 6/2004 |
| JP | 7-67357 | 3/1995 |
| JP | 10-289791 | 10/1998 |
| JP | 2003-333861 | 11/2003 |
| JP | 2004-55523 | 2/2004 |
| JP | 2004-95379 | 3/2004 |
| WO | WO 2005067353 A1 * | 7/2005 |

* cited by examiner

*Primary Examiner*—Douglas W Owens
*Assistant Examiner*—Jianzi Chen
(74) *Attorney, Agent, or Firm*—Wenderoth, Lind & Ponack, L.L.P.

(57) ABSTRACT

A dielectric barrier discharge lamp lighting device includes a transformer that supplies a driving voltage to a dielectric barrier discharge lamp from a secondary coil, and a driving circuit that controls an input voltage to the transformer to supply a driving voltage with a driving frequency fd to the dielectric barrier discharge lamp. The self-resonant frequency fr of the secondary coil, which is measured with the primary coil of the transformer being open, is equal to the driving frequency fd or a frequency in the vicinity of the driving frequency fd. This frequency fr satisfies, for example, $0.9\,fd \leq fr \leq 1.3\,fd$.

7 Claims, 7 Drawing Sheets

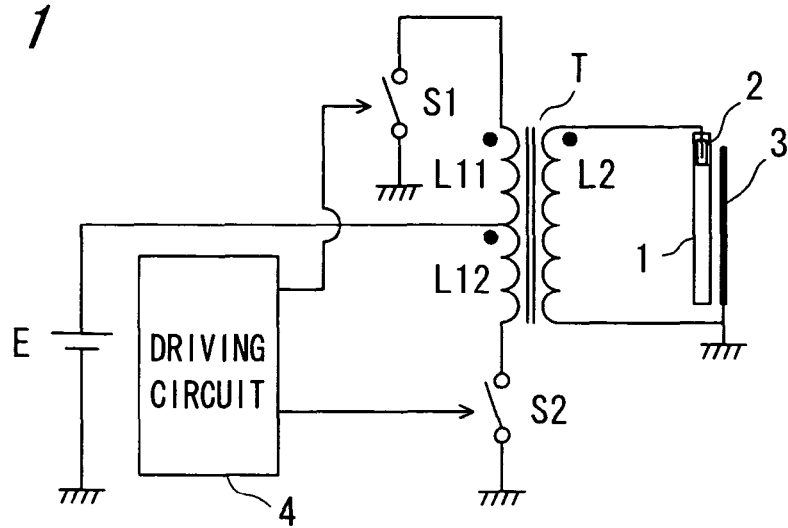
Fig. 1
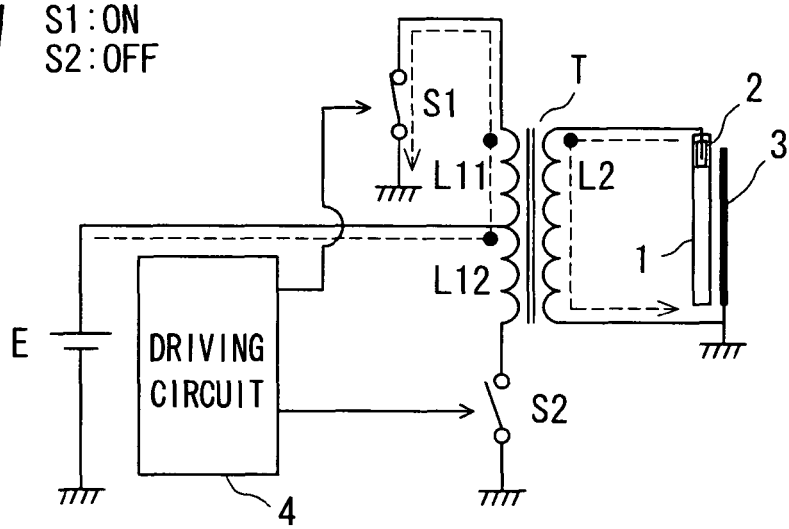
Fig. 2A  S1:ON
S2:OFF
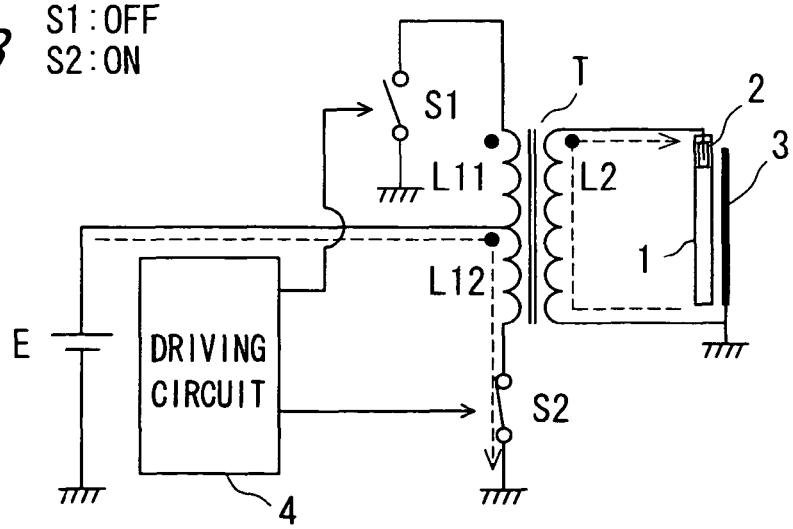
Fig. 2B  S1:OFF
S2:ON

ANALYSIS CIRCUIT DIAGRAM

SECONDARY CURRENT WAVEFORM (PRIOR ART) S1:ON
S2:OFF (PRIOR ART) S1:OFF
S2:ON

DIELECTRIC BARRIER DISCHARGE LAMP LIGHTING DEVICE

BACKGROUND OF THE INVENTION

1. Technical Field

The present invention relates to a dielectric barrier discharge lamp lighting device provided with a driving circuit that includes a transformer.

2. Description of the Related Art

In recent years, along with the development of liquid crystal techniques, liquid crystal displays have been generally used as information display devices such as televisions and monitors. The liquid crystal display has a structure in which a light source device (backlight) is placed on the back face of the liquid crystal and a light from the backlight transmits through a liquid crystal panel to provide a screen display. With respect to the light source mainly used for the backlight, a light source constituted by a number of capillary cold cathode fluorescent lamps arranged therein has been used in most cases.

Here, research and development efforts on a dielectric barrier discharge lamp have been vigorously made so as to apply this to the backlight for liquid crystal. The dielectric barrier discharge lamp contains no mercury inside the lamp, and utilizes light emission of rare gas and therefore, this lamp is environment-friendly and superior in recycling property. Moreover, since the dielectric barrier discharge lamp contains no mercury, there is substantially no time-wise change in luminous flux that occurs in a conventional cold cathode fluorescent lamp during a period of time in which mercury inside the lamp has been warmed and sufficiently vaporized. Hence the lamp has the advantage that a quick start-up of light is available.

As one preferable example of a lighting device for a dielectric barrier discharge lamp, a structure that includes a transformer inside thereof, as shown in FIGS. 10A and 10B, has been developed (see JP-A-2004-95379). This lighting device is connected to an external electrode of a dielectric barrier discharge lamp 1 on the secondary coil L2 side of a transformer T. The primary coil of the transformer T is divided into two coil portions L11 and L12. The primary coils L11 and L12 are connected to switching elements S1 and S2 through one-directional current elements D1 and D2.

These switching elements S1 and S2 are alternately turned on and off by a driving signal from a driving circuit 4. As shown in FIG. 10A, when the driving signal from the driving circuit 4 turns S1 on while turning S2 off, a current flows from the primary coil L11 to ground (GND) through the one-directional current element D1 and the switching element S1. At this time, a positive rectangular wave high voltage is generated in the secondary coil L2 to allow a positive pulse current to flow through the lamp 1. Moreover, as shown in FIG. 10B, when the driving signal from the driving circuit 4 turns S1 off while turning S2 on, a current flows from the primary coil L12 to ground (GND) through the one-directional current element D2 and the switching element S2. At this time, a negative rectangular wave high voltage is generated in the secondary coil L2 to allow a negative pulse current to flow through the lamp 1.

The above-mentioned operations allow the dielectric barrier discharge lamp 1 to light up with pulses of the rectangular wave voltage. Here, it is assumed that since an overshoot and an undershoot of the lamp current (current in the secondary coil L2) are suppressed by functions of the one-directional current elements D1 and D2, no unnecessary ripple current flows through the transformer T so that the loss in the transformer T is effectively suppressed.

Moreover, in one example of the transformer T, it is disclosed that the leakage inductance is preferably set to 2.5% or less, with the lamp voltage (output voltage of the transformer) being preferably set in a range from 1000 to 3000 V (see JP-A-10-289791). It is also disclosed that the luminance is improved by 30% through the above arrangement upon lighting up with the same input power.

Moreover, as shown in FIG. 11, it is disclosed that a stray capacity of the secondary coil of the transformer T and a stray capacity generated around the lamp 1 are utilized as one portion of the resonance circuit, while the resonant frequency of the secondary circuit is adjusted, so that the circuit can be miniaturized and becomes more efficient (see JP-A-07-67357). In the circuit shown in FIG. 11, a resonance circuit is constituted by the leakage inductance of the transformer T, an auxiliary capacitor 5 connected in parallel with the lamp 1 and a stray capacity 6 generated in the secondary circuit such as a stray capacity of the transformer T and a stray capacity generated around the lamp 1. It is disclosed that this arrangement supplies a high voltage to the lamp 1, and that the power factor is improved so that the circuit efficiency is consequently improved.

SUMMARY OF THE INVENTION

However, the inventors of the present invention have clarified through their experiments that in the lighting device for a dielectric barrier discharge lamp, the transformer loss still accounts for most of the losses in the driving circuit. Therefore, the efficiency of the lighting device is mainly dependent on how to suppress the transformer loss.

In addition, in the case when the transformer loss becomes very high, since the temperature of the transformer coil becomes higher, an expensive coil having a highly heat-resistant insulating coating needs to be used in order to ensure a sufficient insulating life of the coil, with high costs.

In the lighting device disclosed in JP-A-2004-95379, it is possible to suppress the loss in the transformer T, but unclear whether or not the loss of the entire circuit can be reduced because of power losses caused by the newly added one-directional current elements D1 and D2. Moreover, in the example of a preferable transformer T disclosed in JP-A-10-289791, the light-emitting efficiency of the lamp is improved by conducting a lighting process through pulses using a low lamp voltage with a reduced leakage inductance. Consequently, this can just suppress the loss in the transformer T but not improve the circuit efficiency. Furthermore, in the lighting device disclosed in Patent Document 3, the leakage inductance of the transformer T, the auxiliary capacitor and the parasitic capacitance come to form a filter. Therefore, the current and voltage to be supplied to the lamp 1 form a substantially sine wave. In the case when a dielectric barrier discharge lamp is driven by a substantially sine wave, the light-emitting efficiency of the lamp 1 is lowered in comparison with a case in which it is driven by a pulse-state current with a voltage having a substantially rectangular waveform, and thus the arrangement of JP-A-07-67357 cannot be applied directly thereto. Moreover, in the circuit which outputs a pulse-shaped current as in the case of the dielectric barrier discharge lamp, even when the resonance conditions of the secondary circuit are changed using the auxiliary capacitor 5 or the like, the power factor is not always improved, with the result that loss suppressing effect on the transformer T can not be expected.

The present invention has been devised to solve the above-mentioned problems, and its objective is to provide a lighting device for a dielectric barrier discharge lamp which can suppress the transformer loss to a minimum level, and has a structure in which a transformer can be formed at comparatively low costs.

A dielectric barrier discharge lamp lighting device according to the present invention is a lighting device used for driving a dielectric barrier discharge lamp that has an inner electrode and an external electrode. The lighting device includes a transformer that has a primary coil and a secondary coil and supplies a driving voltage to the dielectric barrier discharge lamp from the secondary coil, and a driving circuit that controls an input voltage to the transformer to supply the dielectric barrier discharge lamp with a driving voltage with a driving frequency fd. In the transformer, a self-resonant frequency fr of the secondary coil that is measured with the primary coil being open is equal to the driving frequency fd or a frequency in the vicinity of the driving frequency fd.

In the dielectric barrier discharge lamp lighting device, the self-resonant frequency fr may be preferably set to satisfy: $0.9\ fd \leq fr \leq 1.3\ fd$. Alternatively, it may be set to satisfy: $0.95\ fd \leq fr \leq 1.25\ fd$. Alternatively, it may be set to satisfy: $1.0\ fd \leq fr \leq 1.2\ fd$.

In the dielectric barrier discharge lamp lighting device, the driving voltage may be a voltage having a substantially rectangular waveform.

In the dielectric barrier discharge lamp lighting device, the driving circuit may include, for example, a push-pull inverter or a half-bridge inverter.

In the present invention, the self-resonant frequency of the secondary coil, which is measured with the primary coil of a transformer being open, is set closer to the driving frequency of the driving circuit so that the loss in the transformer is reduced to a minimum level. Moreover, since the temperature of the transformer is lowered, comparatively inexpensive transformer winding materials can be used so that it becomes possible to reduce the manufacturing cost of the lighting device.

BRIEF DESCRIPTION OF THE DRAWINGS

FIG. 1 is a diagram illustrating a structure of a dielectric barrier discharge lamp lighting device in accordance with a first embodiment of the present invention.

FIGS. 2A and 2B are diagrams explaining operations of the dielectric barrier discharge lamp lighting device in accordance with the first embodiment of the present invention.

REFERENCE SIGNS

Figure 3A:
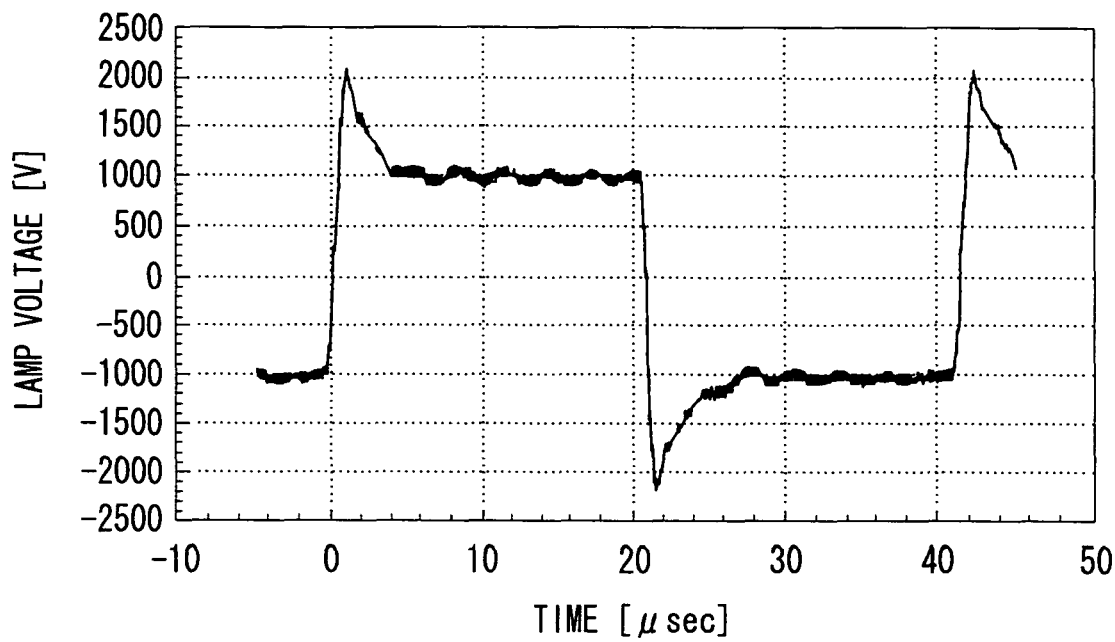
FIGS. 3A and 3B are diagrams showing respectively a voltage waveform and a current waveform during operations of the dielectric barrier discharge lamp lighting device in accordance with the first embodiment of the present invention.

1 lamp
2 external electrode
3 internal electrode
4 driving circuit
5 auxiliary capacitor connected to a lamp in parallel
6 stray capacity generated in the secondary circuit, such as stray capacity of a transformer (T) and stray capacity generated around the lamp 1
T transformer
L11 and L12 first part of primary coil
L2 secondary coil
D1 and D2 one directional current element
S1 and S2 switching element
E DC power supply
C1 and C2 capacitor

DETAILED DESCRIPTION OF THE INVENTION

Referring to drawings, the embodiments of the invention is described below.

Embodiment 1

FIG. 1 is a diagram illustrating a structure of a dielectric barrier discharge lamp lighting device in accordance with a first embodiment of the present invention.

In FIG. 1, the lighting device lights a lamp 1, and includes a transformer T that generates a driving voltage to the lamp 1, switching elements S1 and S2 that control an input voltage to be applied to the transformer T, and a driving circuit 4 that drives the switching elements S1 and S2.

The lamp 1 is a dielectric barrier discharge lamp having an external electrode 2 placed along the axis in the length direction and an internal electrode 3 that is attached to one end of the lamp 1, and is made of a light-transmitting material such as soda glass and borosilicate glass. Here, a mixed gas of 160 Torr composed of Xenon and Argon, is sealed the inside of the lamp 1, and a fluorescent coat film is formed on the inner face of the lamp 1. In the present embodiment, the lamp 1 has a size of $\phi 2.6$ mm and 160 mm in length.

The external electrode 2 and the internal electrode 3 are respectively connected to the secondary coil L2 of the transformer T. The transformer T further includes primary coils L11 and L12, and one end of each primary coil L11 or L12 is connected to a DC power supply E, with the other end being connected to ground (GND) through each of switching elements S1 and S2. Moreover, the switching elements S1 and S2 are respectively connected to the driving circuit 4, and alternately turned on and off in response to a control signal generated in the driving circuit 4. In general, the driving circuit system having the above-mentioned structure has been known as a push-pull inverter. The driving circuit 4 controls on/off operation of the switching elements S1 and S2 to control the input voltage to the primary coils L11 and L12 of the transformer T, thus controlling the voltage and frequency of the driving voltage of the lamp 1.

Referring to FIGS. 2A and 2B, operation of the dielectric barrier discharge lamp lighting device having the above-mentioned combined structure is described.

As shown in FIG. 2A, when the driving circuit 4 outputs control signals for turning on the switching element S1 and turning off the switching element S2, a current flows from the DC power supply E to GND through the primary coil L11 of the transformer T and the switching element S1. Consequently, a negative voltage is generated on the terminal of the secondary coil L2 of the transformer T on the side connected to the internal electrode 2, and thus a current flows from the internal electrode 2 toward GND.

Next, as shown in FIG. 2B, when the driving circuit 4 outputs control signals for turning off the switching element S1 and turning on the switching element S2, a current is supplied from the DC power supply E to GND through the primary coil L12 of the transformer T and the switching element S2. Consequently, a positive voltage is generated on the terminal of the secondary coil L2 of the transformer T on the side connected to the internal electrode 2, and thus a current flows from GND to the internal electrode 2.

In this manner, an alternate voltage is generated between electrodes of the lamp 1 through the switching operations of the switching elements S1 and S2 so that discharge plasma is generated inside the lamp 1. When the discharge plasma is generated, the filling gas is excited, and when returned to its normal state, ultraviolet or visible light rays are emitted. The ultraviolet rays are converted into visible light rays by fluorescent film coated on the inner face of the lamp 1 to be emitted outside of the lamp 1.

Figure 3B:
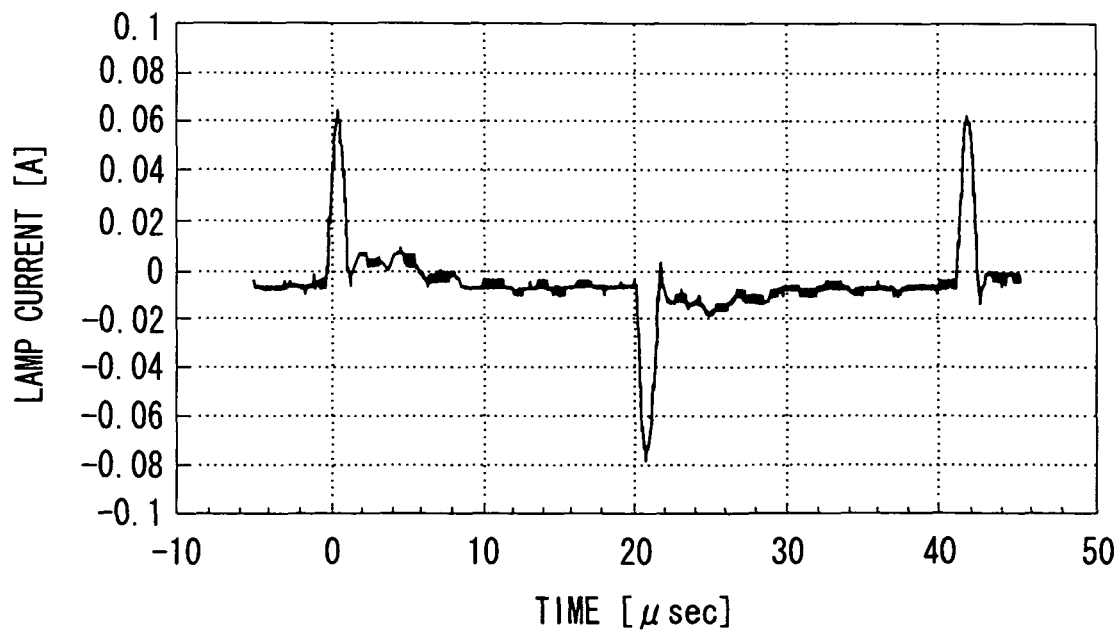

The alternating voltage generated in the lamp 1 (voltage generated in the secondary coil L2 of the transformer T), has a substantially rectangular waveform as shown in FIG. 3A. The reason why the rectangular waveform is preferably used is because, a current flowing through the lamp 1 which has a pulse shape makes the quiescent period longer so that the light emitting efficiency is enhanced. The dielectric barrier discharge lamp has a structure in which a capacitor is formed between a plurality of electrodes. Therefore, the impedance of the lamp 1 is capacitive. Consequently, the waveform of the current flowing through the lamp 1 is represented by differentiation of the voltage waveform as shown in FIG. 3B, and formed into a pulse shape in principle. Here, the structure of the above-mentioned lighting device is the same as that of a conventional device.

In the present embodiment, a core having an initial permeability of 2400 is used as the transformer T with no gap formed in the core. This is because the rise speed of the lamp voltage waveform is made fast by suppressing the leakage inductance as much as possible. In the transformer T of the present embodiment, a coupling coefficient between the primary coils L11, L12 and the secondary coil L2 is set to 0.999 or more.

The coil of the transformer T is wound around a bobbin in the following processes. First, the secondary coil L2 is wound in a predetermined number of turns. The coil material in the present embodiment is a single wire with a diameter of $\phi 0.08$ mm. However, the wire diameter can be appropriately selected from a range of $\phi 0.02$ mm to $\phi 0.15$ mm in consideration of the outer diameter of the finished coil. With respect to the winding method, various winding methods, such as alignment winding and sets of winding, may be used. In the present embodiment, the sets of winding is used. After the secondary coil L2 is wound, an insulating tape is wound thereon. Here, the thickness of the tape is desirably determined in consideration of the insulating property between the primary coil and the secondary coil. After the insulating tape is wound, the primary coils L11 and L12 are wound thereon through bifilar winding. In this case, a litz wire, which is constituted by combined six single wires of $\phi 0.12$ mm is used as the primary coil. Lastly, the coil is fixed by winding a tape thereon so as to prevent disordered winding.

The ratio of the numbers of coil turns between the primary coils L11 and L12, and the secondary coil L2 of the transformer T is determined by the ratio of an optimal driving voltage of the lamp 1 and the voltage of the power supply E. In the case of the lamp 1 of the present embodiment, the power supply voltage is 20 V, the ratio of the numbers of coil turns can most preferably be set to 1:53, and a voltage (voltage between electrodes) generated across the lamp can be most preferably set to about 4 kV in peak-to-peak voltage. Here, theoretically, the secondary voltage of the transformer T is supposed to be about 2 kV in peak-to-peak voltage in the case of the input voltage of 20 V and the ratio of coil turns of 1:53. However, due to a reverse voltage generated instantaneously upon switching, the peak value of the secondary voltage becomes a voltage higher than 53 times of the 20 V power supply voltage. In the following description, the ratio of coil turns is set to 1:53, unless otherwise indicated.

The inventors of the present invention have conducted experiments, and evaluated power losses in the respective parts of the dielectric barrier discharge lamp lighting device having the above-mentioned structure. As a result, it has been found that with respect to the entire power loss, the loss in the transformer T forms the major factor.

Figure 4:
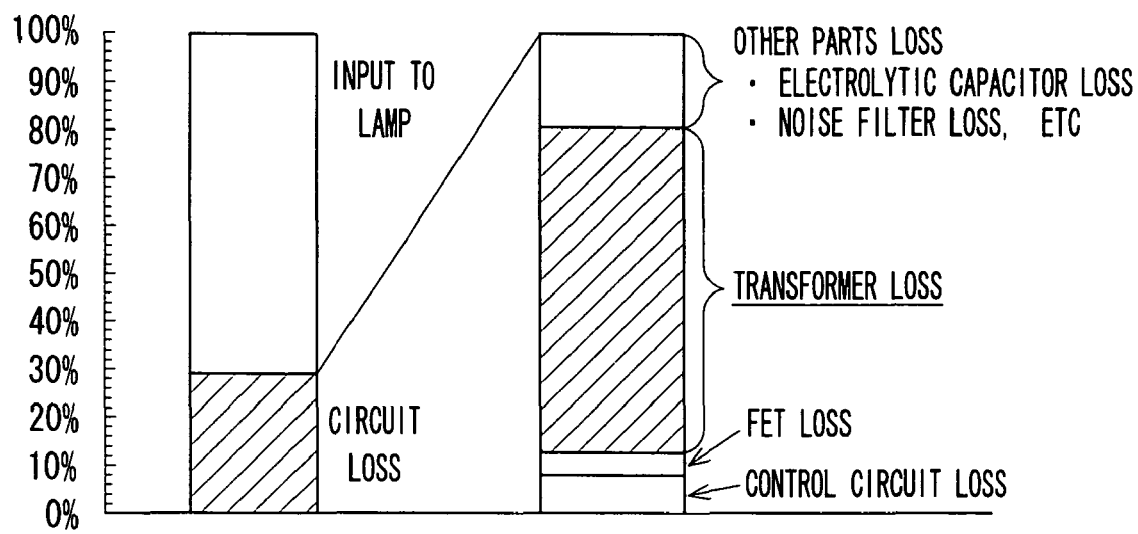
FIG. 4 is a diagram showing contents of power loss in the dielectric barrier discharge lamp lighting device.

FIG. 4 indicates the contents of losses of power inputted to the lighting device. As shown in FIG. 4, the power loss in the lighting device includes a loss due to the transformer, a loss due to FETs serving as switching elements, a loss due to the driving circuit 4, and losses caused by the other parts such as capacitors and noise filters. In particular, FIG. 4 indicates that the most of the power loss is caused by the transformer T. Therefore, it is very important to suppress the loss in the transformer to a minimum level.

The numbers of coil turns in the transformer T is normally determined from the viewpoint of the presence or absence of saturation and the permissible loss in the transformer. It can be set to any desired value as long as the ratio of the numbers of coil turns is unchanged. Accordingly, various transformers T having different numbers of coil turns were made, which have constant ratio of the numbers of coil turns, and the temperature rise of each transformer T was examined by operating the resulting lighting devices.

Figure 5:
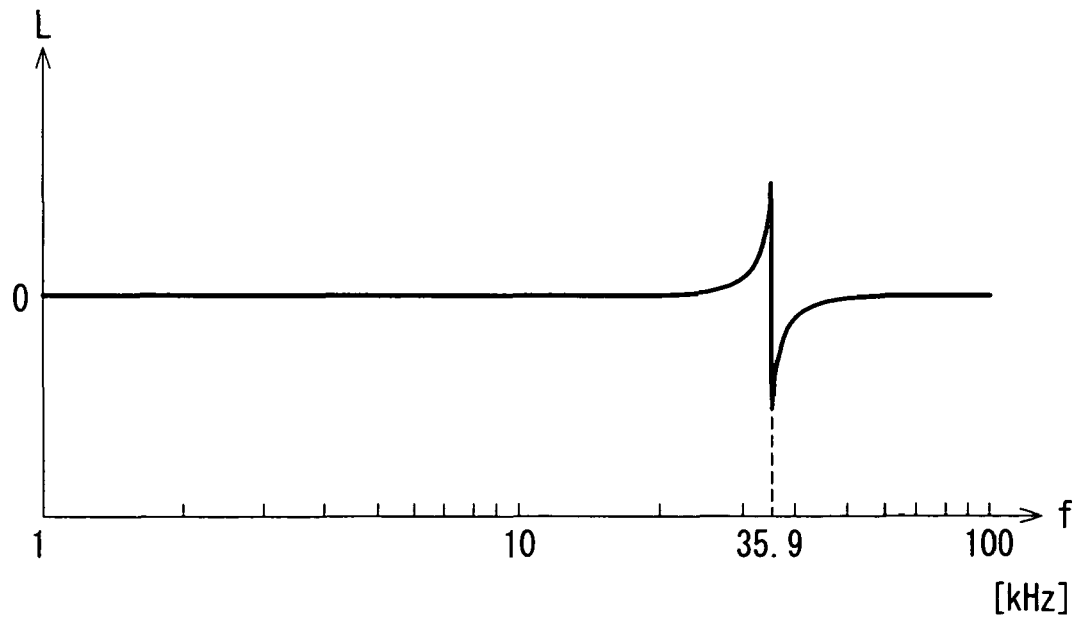
FIG. 5 is a graph showing a frequency characteristic of transformer inductance in the first embodiment of the present invention.

In general, the transformer T generates self-resonance due to a parasitic capacitance in the coils and an inductance of the coils of their own. FIG. 5 shows a frequency characteristic of inductance measured across the secondary coil L2, with the primary coils L11 and L12 being open in the transformer T. As shown in FIG. 5, the inductance has an abrupt frequency characteristic (resonant frequency: 35.9 kHz).

When the number of coil turns in the transformer T is increased, the inductance rises and the parasitic capacitance also increases, with tendency to decrease self-resonant frequency. Normally, it is considered that, in the case when the transformer T generates self-resonance, a resonance current is generated due to resonance inside the transformer T to cause an increase in the loss. Therefore, in general, the transformer T is designed so that the self-resonant frequency is maintained at a sufficiently high value in comparison with the frequency (driving frequency of the circuit) at which the transformer T actually operates.

Here, the experiments of the inventors of the present invention have verified that, when the driving frequency of the circuit and the self-resonant frequency of the transformer T are made closer to each other, the loss in the transformer T can be reduced to a lower level.

Figure 6:
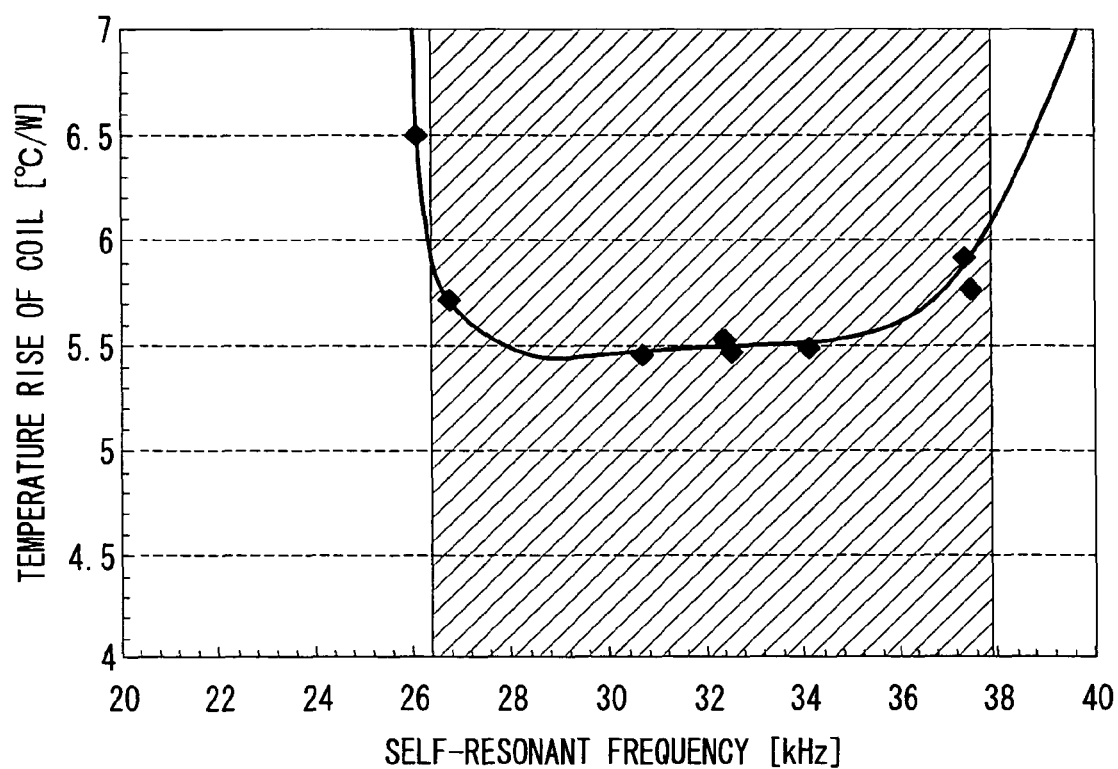
FIG. 6 is a graph showing the relationship between a self-resonant frequency and a temperature rise (loss) in the transformer in the first embodiment of the present invention.

FIG. 6 shows a relationship between the self-resonant frequency and the temperature rise in the transformer T, when the self-resonant frequency possessed by the secondary coil L2 of the transformer T is changed, while the number of coil turns is changed with the constant ratio of the numbers of coil turns. Here, the self-resonant frequency was measured across the secondary coil L2 with primary coils L11 and L12 of the transformer T kept open. Moreover, the driving frequency of the circuit was set to about 29 kHz.

As clearly indicated by FIG. 6, when the self-resonant frequency becomes extremely lower than the driving frequency (about 29 kHz), that is, when the self-resonant frequency becomes lower than 26 kHz, the transformer loss (temperature rise in the coils) drastically increases. As described above, it is considered that the increase in the loss is caused by an increase in the inner loss of the transformer T due to a resonance current. When the self-resonant frequency is set in a frequency range of 26 kHz to kHz, the temperature of the coils is stabilized in a comparatively low temperature level.

In contrast, when the self-resonant frequency is set in a sufficiently higher level than the driving frequency (about 29 kHz) with reduced number of coil turns of the transformer T, that is, when the self-resonant frequency exceeds 38 kHz, the loss becomes greater, resulting in a drastic temperature rise in the transformer T.

As described above, the loss in the transformer T indicates a bath-tab curve which has a minimum value in a range of the driving frequency of the circuit which is very close to the self-resonant frequency of the secondary coil L2 of the transformer T. It is found that, in the vicinity of the minimum value of the loss, that is, in the shaded area (frequency range in which the self-resonant frequency is set from 26 kHz to 38 kHz) in FIG. 6, the loss is maintained in a constant level within a comparatively large range. The fact that there was a constant level in the loss with respect to the self-resonant frequency was hardly expected even in the dielectric barrier discharge lamp of the present embodiment. The reason for this is explained as follows. The dielectric barrier discharge lamp has a very high quality factor. The reason for the high quality factor is because the dielectric barrier discharge lamp generates a discharge through a dielectric material such as glass to cause a structure in which a capacitive element is connected to the load (here, when a resistor element is connected to the load, the quality factor becomes smaller). When the quality factor is very high, the frequency characteristic of the supplied power has a sharp peak. Therefore, the loss with respect to the self-resonant frequency also has an sharp peak, and the constant level exists in the loss with respect to the self-resonant frequency. This could not be expected.

From the results of the above-mentioned embodiment, it has been found that the self-resonant frequency fr of the transformer T is preferably set to a value equal to or in the vicinity of the driving frequency fd of the circuit. More specifically, with respect to the self-resonant frequency of the transformer T, the following range is found as a desirable range based upon FIG. 6.

0.9 fd≦fr≦1.3 fd (shaded area in FIG. 6)

As a comparative example, a prototype transformer T that had a sufficiently higher self-resonant frequency in comparison with the driving frequency 29 kHz was produced by reducing the numbers of coil turns of the primary coils L11 and L12 and the secondary coil L2 so as to have a self-resonant frequency of 40.4 kHz, and was evaluated in the same manner. As a result, the heat generation in the transformer T became 7.44° C./W, indicating that the loss was very high.

FIG. 6 indicates that there is a difference of about 2.5° C./W in heat generation in the transformer T between the comparative example and the present invention. Therefore, for example, when the input power to a lighting device is 10 W, the temperature difference of the transformers T is about 25° C. Generally, temperature rise of the transformer T by 8° C. causes the withstand voltage life of the insulating coating of the transformer coil to be reduced to substantially half. This fact shows that the withstand voltage life of the insulating coating of the transformer coil in the present invention is expected to become about 10 times longer than that of the transformer coil of the comparative example.

The reason for an increase in the transformer loss when the self-resonant frequency is sufficiently higher than the driving frequency is presumably explained as follows.

When the load of the driving circuit is capacitive as in the case of the dielectric barrier discharge lamp, the output current of the driving circuit (that is, current flowing through the transformer T) is represented by differentiation of the voltage waveform. Thus the resulting current waveform has a spike waveform in which the current flows in a concentrate manner during the voltage rise period. In contrast, when the transformer T has a parasitic capacitance, resonance is generated between the leakage inductance and the parasitic capacitance of the transformer T, resulting in an oscillation current such as that shown in FIG. 3B. This oscillation current is damped mainly by a resistance component possessed by the transformer T. Therefore, it is considered that reducing the number of coil turns of the transformer T causes the damping of the oscillation current to be delayed, resulting in an increase in the loss.

Figure 7A:
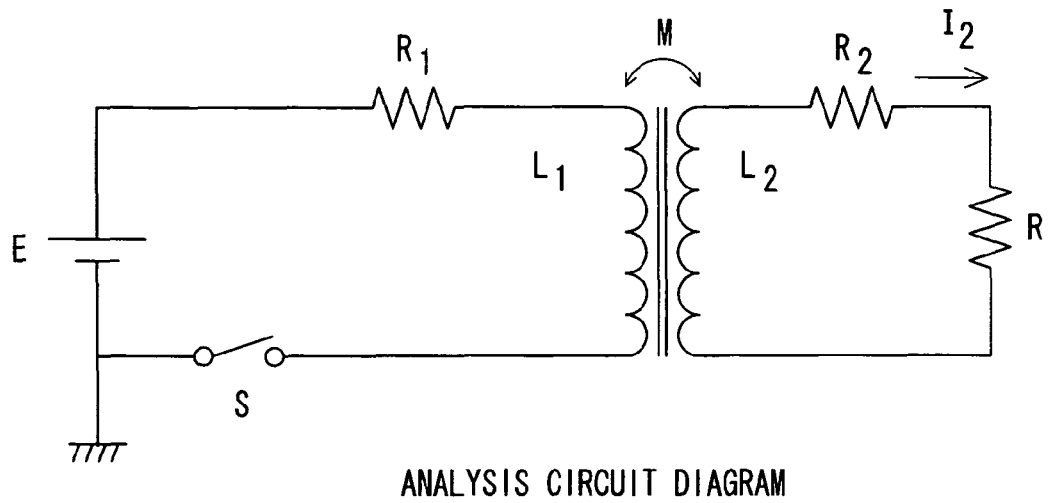
FIGS. 7A and 7B illustrate diagrams explaining a transformer current in the first embodiment of the present invention.
Figure 7B:
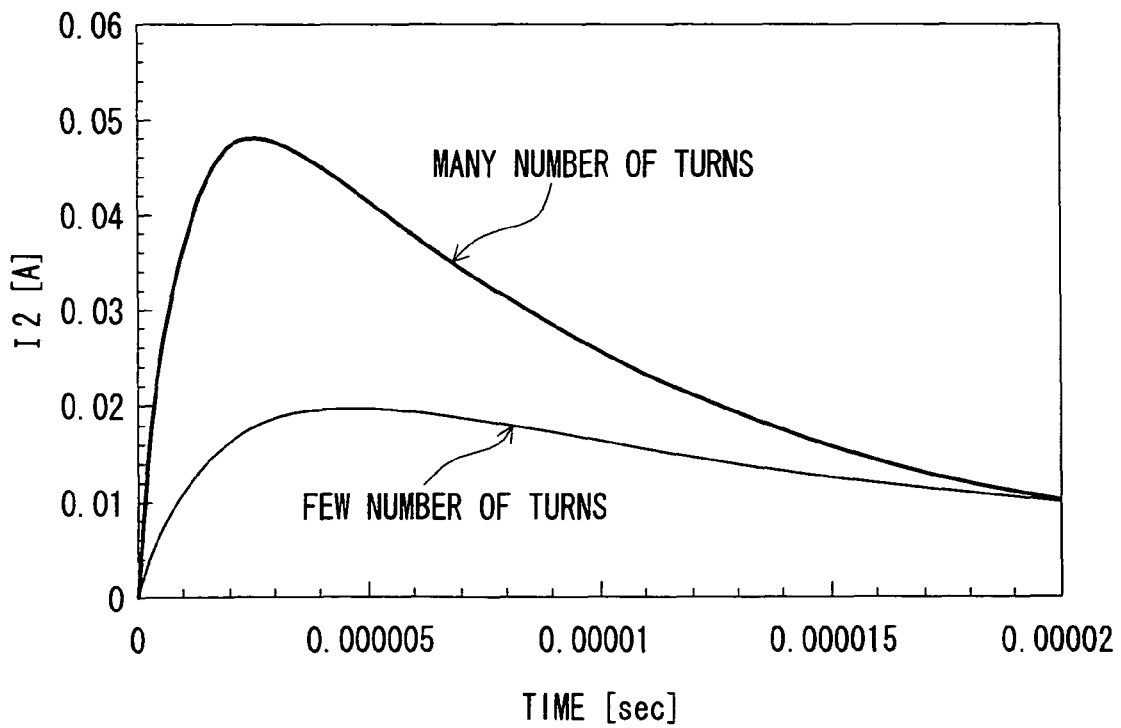

FIG. 7A shows an equivalent circuit with a resistance load connected to the transformer T, which omits the parasitic capacitance of the transformer T and shows only one coil provided on the primary side for convenience of explanation. In FIG. 7A, "L1" and "L2" respectively indicate inductances of the primary coil and the secondary coil, "R1" and "R2" respectively indicate resistance components of the primary coil and the secondary coil, "M" indicates mutual inductance and "R" indicates a resistance value of a load. Moreover, "S" indicates a switch. In the circuit of FIG. 7A, when the switch S is suddenly turned on, the current I2 flowing through the secondary side is found to be represented by the following equations. Moreover, the schematic waveform of the current indicated by the next equations is shown in FIG. 7(b).

$$I_2 = \frac{(\alpha^2 - \beta^2)ME}{\beta R_1(R_2 + R)} e^{\alpha t} \sinh \beta t \quad (1)$$

$$\alpha = \frac{L_1(R_2 + R) + L_2 R_1}{2(L_1 L_2 - M^2)} \quad (2)$$

$$\beta = \frac{\sqrt{[L_1(R_2 + R) - L_2 R_1]^2 + 4R_1(R_2 + R)M^2}}{2(L_1 L_2 - M^2)} \quad (3)$$

When the number of coil turns in the transformer T is small, any of the values L1, L2, R1 and R2 become small values, with the result that damping of the secondary current I2 becomes very slow as indicated by FIG. 7B. This clearly indicates that, when the number of coil turns is small, the oscillation current is maintained for a long period of time.

Based upon the results shown above, it is found that the increase in the loss of the transformer that occurs when the self-resonant frequency is sufficiently higher than the driving frequency is caused by a spike current generated by the dielectric barrier discharge lamp which is capacitive, and caused by the small number of coil turns of the transformer.

It is noted that, with respect to a power supply device for a solar battery, there is a document (JP-A-2003-333861) that discloses a relationship between the efficiency of the power supply device and the self-resonant frequency. This document shows that the transformer itself preferably has a high self-resonant frequency, and proposes a technique to reduce the number of coil turns in the transformer smaller in order to achieve the high self-resonant frequency. In the power supply device disclosed in this document, the loss in the coils of the transformer, caused by resonance between the "parasitic capacitance" and "leakage inductance" is very small, which is different from the dielectric barrier discharge lamp lighting device of the present embodiment. The following description will discuss the difference in the power supply devices between the present embodiment and the document, in detail.

The load in the power supply device described in JP-A-2003-333861 is a battery or a resistive element forming a resistance load, which allows a current to always flow continuously into the load. Since the current continuously flows into the load, the energy accumulated in the "leakage inductance" in the coils of the transformer T, is also continuously taken out and feed to the load. Consequently, even though the energy in the transformer becomes smaller and a parasitic capacitance exists in the transformer, the resonance current between the "parasitic capacitance" and "leakage inductance" in the coils of the transformer T becomes smaller. Thus, the loss in the transformer is very small, and the loss is mainly caused by copper loss in the coils. In contrast, in the dielectric barrier discharge lamp lighting device in the present embodiment, since the load is capacitive, there is a period in which no current flows through the transformer T, as described above. In the period in which no current is outputted to the load by the transformer T, energy accumulated in the leakage inductance in the transformer T loses its destination. The energy which has lost its destination forms a resonance current generated by the "parasitic capacitance" and "leakage inductance" in the coils of the transformer T, and causes a great energy loss inside the transformer T. Consequently, the power supply device described in JP-A-2003-333861 and the dielectric barrier discharge lamp lighting device of the present embodiment are different in that the load is resistive or capacitive, and the causes to generate the loss in the transformer T are largely different between them.

Moreover, JP-A-2003-333861 has described that in the power supply device for a solar battery, it is better to make the number of coil turns in the transformer smaller. In the present embodiment it is preferable to make the number of coil turns in the transformer greater in order to damp the spike current to improve the efficiency of the transformer. Consequently, these points are contradictory.

In FIG. 7A, the parasitic capacitance is omitted for convenience of analysis. However, even in the case of a circuit to which a parasitic capacitance is applied, basically the same operation and effect are obtained although a current has a shape of sine-wave oscillation with the above-mentioned damping rate.

When the self-resonant frequency of the transformer T is very low in comparison with the driving frequency, the inductance of the secondary coil L2 becomes a negative value in appearance, failing to calculate the mutual inductance M ($M^2 = k^2 L1 L2$, where k represents a coupling coefficient). For this reason, it is not possible to carry out the above-mentioned analysis. Although the detailed reason for this is unclear, it is assumed that, in this case also, a resonance current due to the self-resonance causes a loss to be changed to an increase.

It is noted that the coupling coefficient of the transformer T is preferably set in a range of 0.99 or more. The coupling coefficient of less than 0.99 fails to provide a drastic rise in the lamp voltage waveform due to influences from leakage inductance, and the waveform comes closer to the sine waveform as the coupling coefficient is lowered. Hence, the light-emitting efficiency of the lamp 1 is lowered.

Next, ten prototype coils having the same specification were produced by using an automatic wire-winding machine, and deviations in the self-resonant frequency were examined. As a result, the standard deviation σ was 1.66% of the average value. Therefore, when the deviation 3σ of the self-resonant frequency is permitted, the following relation is desirably satisfied in order to positively set the transformer loss in the area of the minimum value, $$0.95\ fd \leq fr \leq 1.25\ fd$$

where the driving frequency of the circuit is fd, and the self-resonant frequency is fr.

Moreover, in order to permit a deviation of 6σ, the following relation is further preferably satisfied.

$$1.0\ fd \leq fr \leq 1.2\ fd$$

Here, the self-resonant frequency of the transformer T can be changed to some extent depending on the winding method of the coil.

Figure 8:
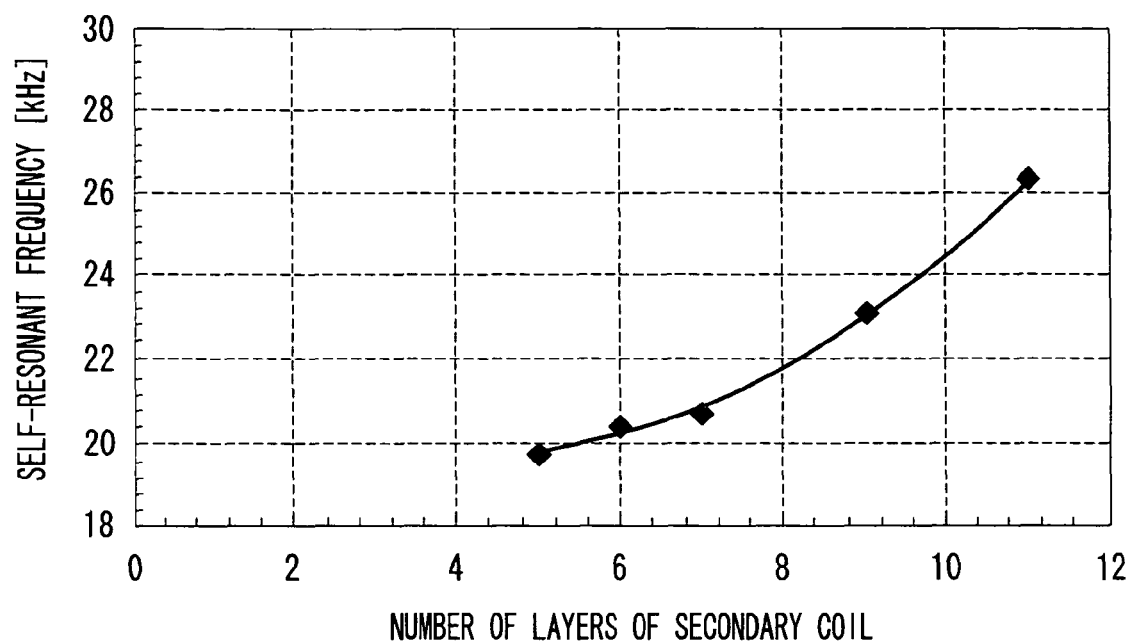
FIG. 8 is a graph showing the relationship between the number of winding layers of a coil and a self-resonant frequency in the first embodiment of the present invention.

FIG. 8 indicates change in self-resonant frequency with the number of winding layers altered by changing the wire diameter of the coil of the secondary coil L2. In this case, the winding method of the secondary coil is an alignment winding method. As indicated by FIG. 8, as the number of winding layers of the secondary coil L2 increases, the self-resonant frequency rises monotonically. Therefore, in order to reduce the self-resonant frequency so as to make the self-resonant frequency approach the driving frequency of the circuit, for example, the number of winding layers can be reduced by making the wire diameter slightly thinner, or the number of winding layers can be reduced by making the core size longer so as to increase the number of coil turns per layer. Thus, a designing process is carried out so as to make the self-resonant frequency sufficiently closer to the driving frequency.

The following description will discuss differences between the present embodiment and the prior art disclosed by JP-A-07-67357.

Figure 11:
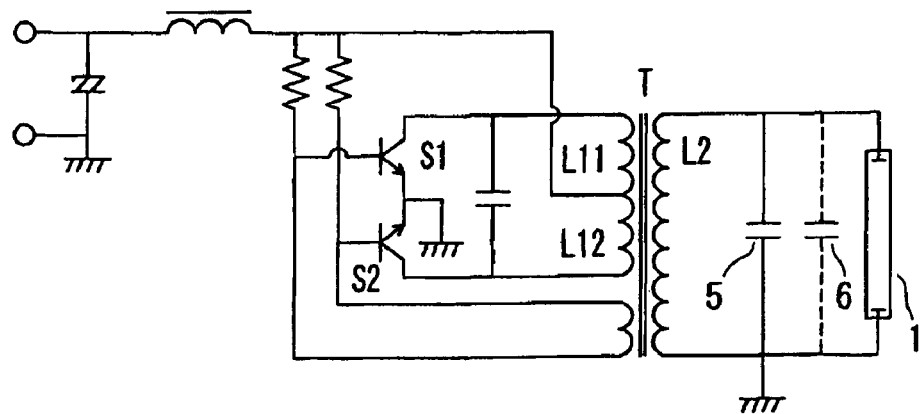
FIG. 11 is a diagram illustrating a structure of a conventional discharge lamp lighting device.

FIG. 11 shows a circuit diagram of a lighting device disclosed in JP-A-07-67357. In the circuit of FIG. 11, on the secondary side of the transformer T, a resonance circuit is constituted by a leakage inductance L2 of the transformer T, an auxiliary capacitor 5 and a parasitic capacitance 6. It is said that, when the driving frequency of the circuit is extremely close to the resonant frequency of the secondary side circuit, the impedance of the secondary side circuit becomes substantially resistive and the power factor is improved so that the copper loss of the transformer T becomes smaller to suppress the circuit loss.

When the lamp voltage and lamp current are substantially sine waveform, such as, when the lamp 1 is a cold cathode-ray fluorescent lamp, a hot cathode-ray fluorescent lamp or the like, as shown in the prior art (JP-A-07-67357), the power factor can be improved by adjusting the resonant frequency of the secondary side circuit. However, in the case of a dielectric barrier discharge lamp as disclosed in the present invention, the circumstances are completely different. As described earlier, in the case of the dielectric barrier discharge lamp, the current waveform generated in the lamp 1 has most preferably a pulse shape in terms of long non-conduction period of current. But in terms of the light-emitting efficiency of the lamp 1, it is not possible to adopt a method of, such as expanding the conduction angle of the lamp current and making a waveform close to a substantially sine waveform. Therefore, it is impossible to use the circuit construction of Patent Document 3 shown in FIG. 11 for the dielectric barrier discharge lamp lighting device.

Moreover, in the case of the circuit construction of FIG. 11, it is clear that a filter is formed by the inductance component L2 caused by the leakage inductance of the transformer T and a capacitive component by the parasitic capacitance 6 and the auxiliary capacitor 5. In this case, when the transformer T is driven with a voltage having a substantially rectangular waveform to drive the lamp 1 with a substantially rectangular waveform, the current outputted from the secondary coil L2 contains a very large high-frequency component. This high-frequency component is hardly transmitted to the lamp 1 side due to the above-mentioned inductance component, but the transmitted high-frequency current easily passes through the capacitive component to flow toward the ground. Consequently, the current and voltage to be supplied to the lamp 1 also form substantially sine waves. Therefore, the output current of the secondary coil L2 of the transformer T flows back to the secondary coil L2 through the leakage inductance and the parasitic capacitance. This might cause a large power loss inside the transformer T, and it is impossible to suppress the loss of the transformer T, unlike the present invention.

In contrast, the present invention drives the transformer T with a rectangular waveform, and suppresses the transformer loss to a minimum level even when the above-mentioned loop-path is formed through the parasitic capacitance. Thus, the present invention is essentially different from the prior art shown in FIG. 11.

As described above, conventionally, a transformer was not used in a frequency region in which the self-resonant frequency and the driving frequency are close to each other. It is considered that the reason for this is because the resonance current makes the loss greater, and because, as shown in FIG. 5, the impedance varies greatly in the vicinity of the self-resonant frequency to make the circuit property unstable and consequently to make the power consumption unstable in the entire lighting device.

In contrast, the dielectric barrier discharge lamp has a mechanism in which the capacitance included in the lamp is charged and energy accumulated in the capacitance is used for driving the lamp to emit light. Therefore, the power consumption is substantially determined by the capacitance included in the lamp and the voltage used at the time of charging the capacitance.

As explained above, if the problem of an increased loss due to a resonance current does not occur, the transformer can be sufficiently used even in the area in which the self-resonant frequency and the driving frequency are set close to each other.

The mixed gas of xenon and argon were used for the filling gas of the lamp 1. However, gas, such as xenon, krypton, argon, neon, helium, or a mixed gas properly selected from the group of these gases may be used. The effects of the present invention are not limited by the kinds of filling gas. The effects of the present invention are not limited by the pressure of the filling gas.

The effects of the present invention are not dependent on the shape of electrodes, because the mechanism for reducing the transformer loss is not dependent on the shape of electrodes. The present embodiment has described an inside-outside electrode structure in which one of the electrodes is placed inside the lamp 1 and the other electrode is placed outside the lamp 1. However, even an outside-outside electrode structure in which both of the electrodes are placed outside the lamp may be used with the same effects. The outside electrode is not limited to one in its number, and may be divided into a plurality of parts. Another structure such as a structure with inside electrodes provided to both ends of the lamp 1, may be used. In any of the structures, the mechanism for reducing the transformer loss is the same as long as it is driven with a voltage having a substantially rectangular waveform. Therefore, desirable results are obtained in the scope of the present invention.

The effects of the present invention are not dependent on the dimension of the transformer T. This is because the fact that the loss of the transformer T becomes a minimum level when the self-resonant frequency and the driving frequency of the transformer are close to each other is caused only by a change in the current waveform but is not dependent on another factor such as magnetic flux density generated in the core of the transformer T.

In the present embodiment, although a litz wire is used for the primary coil of the transformer T with a single wire being used for the secondary coil, the single wire may be used for each of the primary and secondary coils. However, the litz wire is more preferably used for the primary coil through which a large current flows because the copper loss in the primary coil can be reduced.

With respect to the voltage range of the power supply E, 12 V or 24 V is most generally used for a backlight of the liquid crystal. However, the effects of the present invention are not dependent on the power-supply voltage because the transformer loss is dependent on the damping speed of a current as described earlier. As clearly indicated by expressions (1) to (3), the power-supply voltage only determines the peak value of the current, and does not affect the damping speed.

Moreover, the effects of the present invention are not dependent on the driving frequency. However, when the driving frequency becomes too high, the voltage is inverted before an excimer light emission in rare gas is sufficiently conducted, and the excimer molecules are damaged by the inverted current to deteriorate the light-emitting efficiency of the lamp. Therefore, the preferable range of the driving frequency may be set from 10 kHz to 50 kHz.

Figure 10A:
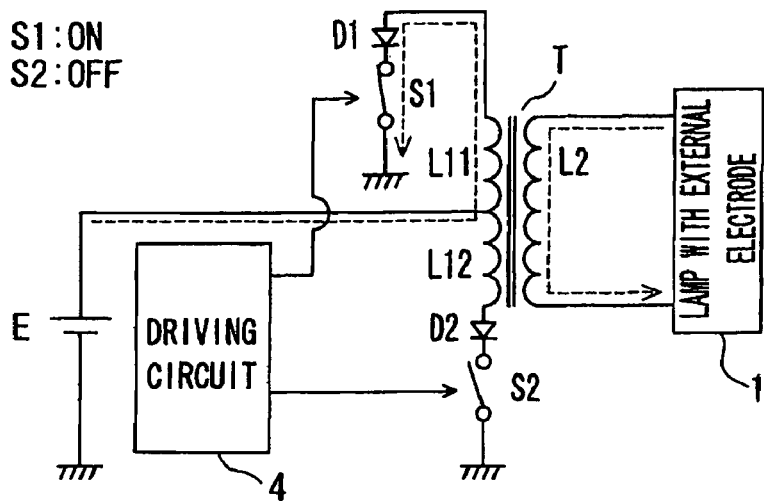
FIGS. 10A and 10B illustrate schematic diagrams showing a structure and operations of a conventional discharge lamp lighting device.
Figure 10B:
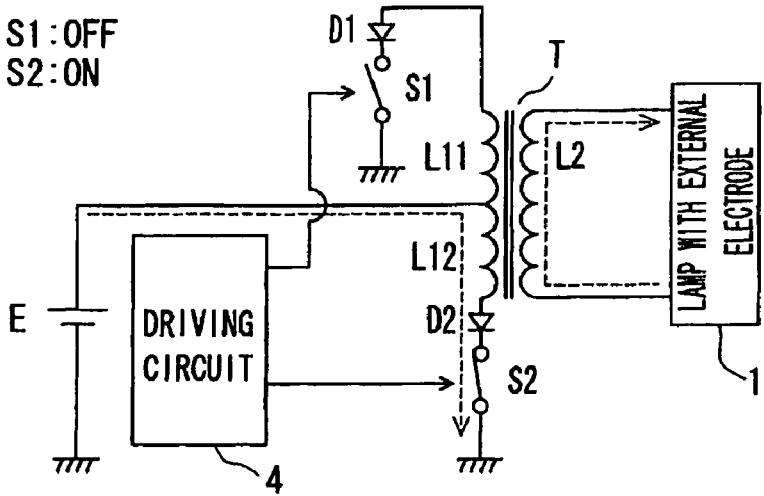

As shown in the driving circuit in the prior art shown in FIGS. 10A and 10B, a diode may be inserted in series between switching elements S1 and S2. Although the loss in the transformer T slightly changes due to the presence or absence of the diode, the preferable range of the self-resonant frequency of the secondary coil of the transformer is the same as that as described above.

Generally bipolar transistors and MOSFET's are used for the switching elements S1 and S2. However, it is clear that the effects of the present invention are not dependent on a type of the switching element.

Embodiment 2

Figure 9:
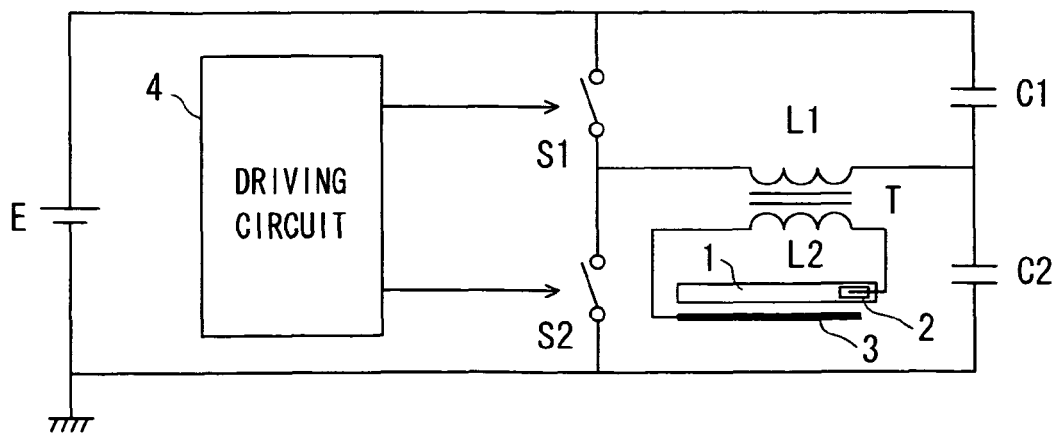
FIG. 9 is a diagram illustrating a structure of a dielectric barrier discharge lamp lighting device in accordance with a second embodiment of the present invention.

FIG. 9 is a drawing that schematically shows a dielectric barrier discharge lamp lighting device in accordance with the second embodiment of the present invention. As shown in FIG. 9, the structure of the second embodiment is different from that of the first embodiment in that the driving circuit is prepared as a half-bridge inverter. Those components that are the same as those of embodiment 1 are indicated by the same reference numerals, and thus the description thereof is omitted. Moreover, since the operations of the inverter itself have been widely known in general, the detailed description thereof is omitted.

When using the half-bridge inverter as shown in the present embodiment and outputting the same voltage as that by a push-pull inverter, the coil ratio needs to be doubled in comparison with the push-pull inverter. That is, when the input voltage E is the same, the coil ratio becomes 1:106. Therefore, in comparison with the number of coil turns of the transformer T when using the push-pull inverter, the number of coil turns of the secondary coil L2 needs to be doubled, or the number of coil turns of the primary coil L1 needs to be reduced to half.

When the number of coil turns of the secondary coil L2 is doubled, the inductance and parasitic capacitance on the secondary side also rise greatly, resulting in a great descent of the self-resonant frequency. Consequently, the condition as shown in embodiment 1, that is, $0.9\ fd \leq fr \leq 1.3\ fd$ (driving frequency of the circuit: fd, self-resonant frequency: fr), is no longer satisfied. Therefore, actually, the half-bridge inverter with a half of number of coil turns for the push pull inverter is preferably used.

In the same manner as in the first embodiment, while varying the numbers of coil turns of the primary coil L1 and the secondary coil L2 with the fixed ratio of coil turns, a preferable range of the coil turns was examined. As a result, substantially in the same manner as the above-mentioned first embodiment, the temperature rise in the transformer T has a minimum value in a range of $0.9\ fd \leq fr \leq 1.3\ fd$.

Instead of the half-bridge inverter in the present embodiment, a full-bridge inverter may be used. In this case also, the same effects as those of the half-bridge inverter shown in the second embodiment, can be obtained.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2005-140881, filed on May 13, 2006, which is expressly incorporated herein by reference in its entirety.

The dielectric barrier discharge lamp lighting device of the present invention makes it possible to suppress the loss in a transformer to a minimum level and to use an inexpensive wiring material. Hence it is useful to a backlight for liquid crystal, and so on.

The invention claimed is:

1. A dielectric barrier discharge lamp lighting device for driving a dielectric barrier discharge lamp having an inner electrode and an external electrode, comprising:
    a transformer that includes a primary coil and a secondary coil, and supplies a driving voltage to the dielectric barrier discharge lamp from the secondary coil; and
    a driving circuit that controls an input voltage to the transformer to supply the driving voltage with a driving frequency fd to the dielectric barrier discharge lamp,
    a self-resonant frequency fr of the secondary coil, which is measured with the primary coil of the transformer being open, is equal to the driving frequency fd.

2. The dielectric barrier discharge lamp lighting device according to claim 1, wherein the self-resonant frequency fr is set to satisfy $0.9\ fd \leq fr \leq 1.3\ fd$.

3. The dielectric barrier discharge lamp lighting device according to claim 1, wherein the self-resonant frequency fr is set to satisfy $0.95\ fd \leq fr \leq 1.25\ fd$.

4. The dielectric barrier discharge lamp lighting device according to claim 1, wherein the self-resonant frequency fr is set to satisfy $1.0\ fd \leq fr \leq 1.2\ fd$.

5. The dielectric barrier discharge lamp lighting device according to claim 1, wherein the driving voltage is a voltage having a substantially rectangular waveform.

6. The dielectric barrier discharge lamp lighting device according to claim 1, wherein the driving circuit includes a push-pull inverter.

7. The dielectric barrier discharge lamp lighting device according to claim 1, wherein the driving circuit includes a half-bridge inverter.

* * * * *